Aug. 12, 1947.  C. S. ROBINSON  2,425,566
VIBRATION ABSORPTION BLOCK
Filed Dec. 15, 1945
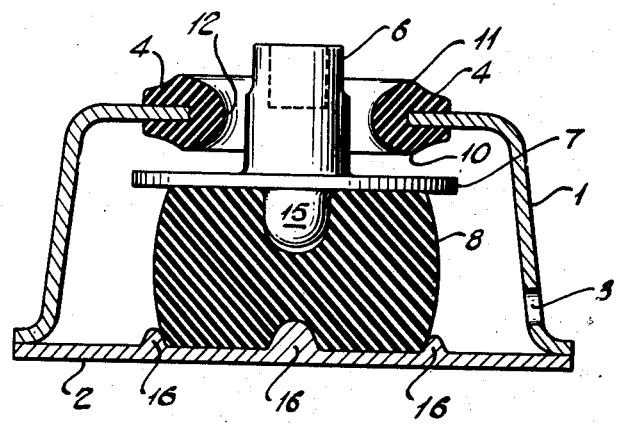
INVENTOR
CECIL S. ROBINSON.
BY
ATTORNEY Patented Aug. 12, 1947

2,425,566

UNITED STATES PATENT OFFICE 2,425,566

VIBRATION ABSORPTION BLOCK

Cecil S. Robinson, New York, N. Y.

Application December 15, 1945, Serial No. 635,303

4 Claims. (Cl. 248—358)

This invention relates to the absorption or deadening of mechanical vibrations, and has for its object the production of a self-contained cushion unit which can be applied to a wide variety of uses without much change in its structure. Another object is to combine absorptive efficiency with small cost. A further object is to provide three directional stabilization characteristics in the absorption of vibrations together with suitable strength and stability in all three directions.

The type of vibrations with which the invention is particularly concerned are generally small and often invisible to casual observation; but in order to make an effective self-contained unit which the purchaser can install without constructing his own limit stops and shock absorbers, the device is constructed to also cushion momentary excessive shocks and impacts beyond the normal vibration range. This is important in view of the fact that supplementary devices added by purchasers unfamiliar with the peculiar difficulties of high-order vibration absorption sometimes tend to create effects which cause the whole system to fail.

Referring now to the drawings forming part of this specification, Fig. 1 is a cross-sectional view of a typical embodiment of the invention. The unit is usually symmetrical about its central axis along which the principal vibration occurs, so that its construction, whether round or rectangular, can be understood from a cross-sectional figure.

The principal exterior portion of the unit consists of a casing 1 surrounding and protecting the operating parts. The bottom of the case 1 is closed by the base 2, which may be either permanently or detachably fastened to the case 1 by bolts, screws, rivets or welding, as desired for the type of installation contemplated. The side walls of the casing 1 may be provided with small drainage or breather openings 3 if desired. The upper wall of the casing 1 is provided with a large opening in which is fitted a resilient grommet 4 of rubber or similar resilient material. This grommet is capable of a three-way cushioning action—up, down and sideways—as will be described. The central opening in the grommet 4 is sufficiently large to surround the mounting stud 6 without touching it under the conditions of normal vibration.

The stud 6 is supported by a flange or washer 7 resting on the resilient cushion 8. This cushion 8 consists of a block or column of elastic composition, such as solid rubber, sponge rubber, or synthetic. The flange 7 is either part of the stud 6 or rigidly attached thereto; and the cushion 8 under no-load conditions is preferably arranged to be somewhat pre-compressed so that the flange 7 will under those conditions be maintained in contact with the under side 10 of the grommet 4. When the stud 6 is attached to its normal load, the cushion 8 is further compressed sufficiently to produce a clearance between the grommet 4 an the flange 7, so that the cushion 8, flange 7 and stud 6 are free to vibrate up and down within the limits of the ordinary vibration range expected without striking the grommet 4. Such a free condition is the normal or usual aspect of the device.

In order to intercept all paths by which vibrations might travel to an object supported on the stud 6, it is necessary that the object be entirely supported by such cushions or other vibration absorptive devices. Accordingly, if the units are to go into general use, they must be capable of three-dimensional absorptive action without creating metallic paths thru the casing. They must also be capable of receiving momentary shocks and impacts much greater than the usual order of vibrations.

The resilient grommet 4 is intended to act as a three-way cushion and limit stop; also to insure lateral stability in the mechanism and prevent vibration of the casing from reaching the sides of the stud 6. This grommet 4 is constructed of a resilient material such as soft rubber or other vibration absorptive composition, and has three working faces or beads, namely the lower bead 10, the upper bead 11, and the inner or annular bead 12. The lower bead 10 intercepts the more extreme upward movements of the flange 7 and stud 6. The upper bead 11 intercepts excessive downward movements of the load or object secured to the stud 6, thus acting as a built-in limit stop. The inner bead 12 does not touch the stud 6 when the stud is centered in its normal position, but gives lateral support and absorbs lateral vibrations when their amplitude is greater than the clearance. Continuous lateral vibrations of small amplitude are generally sufficiently absorbed by the principal cushion 8.

The cushion 8 is not necessarily bonded to the base 2 of the casing 1, but is centered against lateral displacement by the projections 15 and 16 on the stud 6 and base 2 respectively, to give the requisite lateral stability. The freedom from bonding permits various materials to be used for the case, whether capable of bonding to the cushion material or not. This may give somewhat better operating characteristics, as the material is less constrained; and new cushions can be substituted for old without discarding the entire unit. The fact that the flange 7 is stabilized by the grommet bead 10 under light or no-load conditions, and the stud 6 is laterally stabilized by the grommet bead 12 under greater deflections permits a cushion 8 to be used which would of itself be too soft to perform all these functions. This permits more effective cushioning of sustained vibrations, since the choice of material is not limited by occasional extraneous factors.

The foregoing produces a compact, self-contained vibration absorptive unit of general application capable of fairly high efficiency in all directions and having built-in limit stops and buffers in all directions. While certain general limits of loading must be observed, with the units graded according to size, the installation is relatively simple, and so the device is adapted to be employed as a packaged unit for general use.

While I have in the foregoing described certain specific forms by way of example, it will be understood that they are merely for purposes of illustration to make clear the principles of the invention, which is not limited to the particular forms shown, but is susceptible to various modifications and adaptations in different installations as will be apparent to those skilled in the art without departing from the scope of the invention as stated in the following claims.

I claim:

1. In a vibration absorption unit, the combination of a casing, said casing having an opening, an elastic grommet in said opening, a stud extending into the casing thru said grommet, there being clearance between the stud and the grommet under normal conditions of small vibration, a flange on said stud, a block of resilient material supporting said flange and stud, lateral supporting means for said block, the inner side of said elastic grommet serving to limit lateral deflection of the stud and resilient block under excessive lateral impacts, and the upper and lower sides of said grommet serving as vibration absorptive buffers and limit stops.

2. In a vibration absorption unit, the combination of a casing, said casing having an opening, an elastic grommet in said opening, a stud extending into the casing thru said grommet, there being clearance between the stud and the grommet under normal conditions of small vibration, a flange on said stud, a block of resilient material supporting said flange and stud, said block being sufficiently pre-compressed under no-load conditions to hold the flange against the grommet, there being clearance between the grommet and flange under normal loaded conditions of small vibration, lateral supporting means for said block, the inner side of said elastic grommet serving to limit lateral deflection of the stud and resilient block under excessive lateral impacts, and the upper and lower sides of said grommet serving as vibration absorptive buffers and limit stops.

3. In a vibration absorption unit, the combination of a block of resilient material, a stud supported by said block, a casing in which the resilient block is mounted at its base, said casing surrounding and being spaced from said block at the sides and having an opening opposite its base, a ring of resilient material covering the edges of said opening above, below and on the inner sides to form an absorptive cushion, the stud extending from said block thru the ring to the outside of the casing, the resilient ring serving as a limit stop and as an absorptive stabilizer to supplement the resilient block.

4. In a vibration absorption unit, the combination of a block of resilient material, a stud supported by said block, a casing in which the resilient block is mounted at its base, mechanical means for holding the base of the block against lateral movement, the casing surrounding and being spaced from said block at the sides and having an opening opposite its base, a ring of resilient material covering the edges of the opening above, below and on the inner sides to form an absorptive cushion, the stud extending from said block thru the ring to the outside of the casing, the resilient ring serving as a limit stop and as an absorptive stabilizer to supplement the resilient block.

CECIL S. ROBINSON.